(12) United States Patent
Ebihara et al.

(10) Patent No.: US 10,924,701 B2
(45) Date of Patent: Feb. 16, 2021

(54) COLUMN AMPLIFIER RESET CIRCUIT WITH COMPARATOR

(71) Applicant: OmniVision Technologies, Inc., Santa Clara, CA (US)

(72) Inventors: Hiroaki Ebihara, Santa Clara, CA (US); Zheng Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 27 days.

(21) Appl. No.: 16/516,097

(22) Filed: Jul. 18, 2019

(65) Prior Publication Data
US 2021/0021774 A1 Jan. 21, 2021

(51) Int. Cl.
| | |
|---|---|
| H04N 5/378 | (2011.01) |
| H04N 5/374 | (2011.01) |
| H04N 5/335 | (2011.01) |
| H04N 5/359 | (2011.01) |
| H04N 5/232 | (2006.01) |
| H03L 5/00 | (2006.01) |
| G11C 27/02 | (2006.01) |
| G11C 7/06 | (2006.01) |
| G11C 13/00 | (2006.01) |
| H04N 5/3745 | (2011.01) |

(52) U.S. Cl.
CPC ......... *H04N 5/378* (2013.01); *H04N 5/37455* (2013.01); *H04N 5/37457* (2013.01)

(58) Field of Classification Search
CPC .............. H04N 5/378; H04N 5/37455; H04N 5/37457; H04N 5/359; H04N 5/335; H04N 5/23227; H04N 5/23267; H04N 5/3698; H03L 5/00; G11C 27/02; G11C 7/06; G11C 13/0097

USPC ........ 348/300, 301, 302, 308, 313; 341/108, 341/110, 126, 155, 158, 169, 170; 330/9, 330/51, 285, 288, 291, 265, 260, 259, 330/271, 257; 257/291, 292, 159; 250/208.1; 327/210, 307; 375/345

See application file for complete search history.

(56) References Cited

U.S. PATENT DOCUMENTS

| | | | |
|---|---|---|---|
| 7,265,329 B2* | 9/2007 | Henderson | H01L 27/00 250/208.1 |
| 8,687,100 B2* | 4/2014 | Toyama | H04N 5/335 348/308 |
| 2006/0125673 A1* | 6/2006 | Lee | H03M 1/12 341/155 |
| 2006/0197574 A1* | 9/2006 | Naviasky | H03L 5/00 327/307 |
| 2013/0182164 A1* | 1/2013 | Duggal | H04N 5/335 348/302 |

(Continued)

*Primary Examiner* — Marly S Camargo
(74) *Attorney, Agent, or Firm* — Christensen O'Connor Johnson Kindness PLLC (57) ABSTRACT

A column amplifier with a comparator for use in an image sensor includes an amplifier coupled to receive an input signal representative of an image charge from a pixel cell of the image sensor. An amplifier auto-zero switch is coupled between an input of the amplifier and an output of the amplifier. A feedback capacitor coupled to an input of the amplifier. An amplifier output switch coupled between the output of the amplifier and the feedback capacitor. A comparator includes a first input coupled the amplifier output switch. A comparator auto-zero switch is coupled between the first input of the comparator and an output of the comparator.

37 Claims, 9 Drawing Sheets

(56) References Cited

U.S. PATENT DOCUMENTS

| | | | |
|---|---|---|---|
| 2017/0234994 A1* | 8/2017 | Nishihara | G01T 1/2018 250/361 |
| 2020/0266785 A1* | 8/2020 | Jung | H03F 3/50 330/277 |

* cited by examiner

COLUMN AMPLIFIER RESET CIRCUIT WITH COMPARATOR

BACKGROUND INFORMATION

Field of the Disclosure

This disclosure relates generally to image sensors, and in particular but not exclusively, relates to column amplifier circuits for use with analog to digital conversion circuitry in an image sensor.

Background

Image sensors have become ubiquitous. They are widely used in digital still cameras, cellular phones, security cameras, as well as medical, automobile, and other applications. The technology used to manufacture image sensors has continued to advance at a great pace. For example, the demands of higher resolution and lower power consumption have encouraged the further miniaturization and integration of these devices.

Image sensors conventionally receive light on an array of pixels, which generates charge in the pixels. The arrays of pixels are often arranged into a plurality of rows and a plurality of columns. The intensity of the light may influence the amount of charge generated in each pixel, with higher intensity generating higher amounts of charge. The charge information are often read out from the array of pixels through column bitlines. Analog to digital converters (ADCs) are often used in CMOS image sensors (CIS) to convert the charge information from a pixel received through a column amplifier into a digital representation of the charge by the image sensor. Some ADCs include a comparator that compares an image charge signal to a reference voltage signal to generate the digital representation of the charge. The reference voltage signal may conventionally be a ramp signal provided by a ramp generator and the comparator provides an output that can be used with a counter to generate the digital representation of the image charge from the pixel.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples directed to a column amplifier with a comparator are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1:
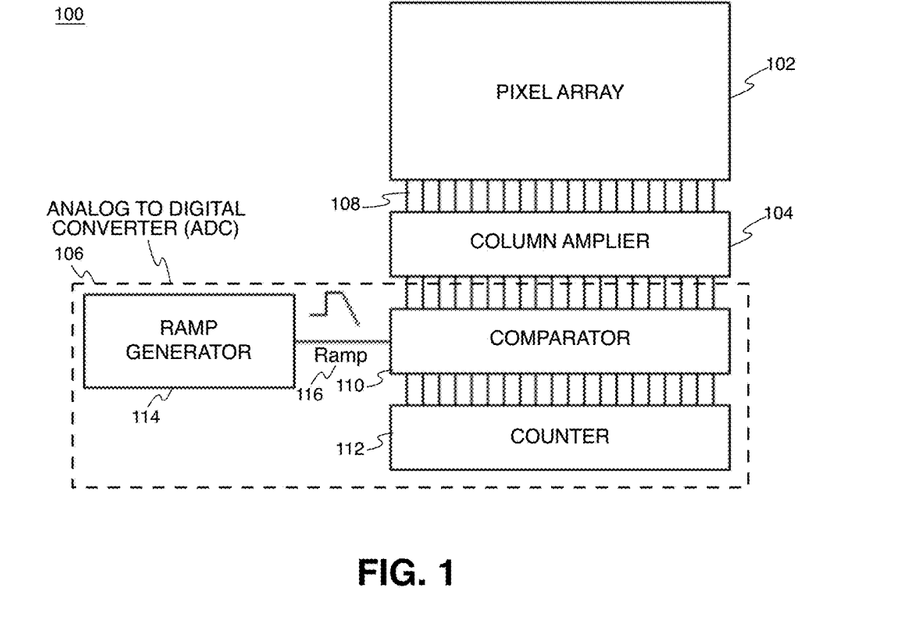
FIG. 1 illustrates one example of an imaging system in accordance with the teachings of the present invention.

FIG. 1 illustrates one example of an imaging system 100 in accordance with an embodiment of the present disclosure. In one example, imaging system 100 is a complementary metal oxide semiconductor (CMOS) image sensor (CIS) and includes a pixel array 102, column amplifier circuitry 104, and analog to digital converter (ADC) circuitry 106. In one example, ADC circuitry 106 includes a comparator 110 coupled to column amplifier 104. Comparator 110 is coupled to receive a ramp signal 116 from a ramp generator 114. In the example, the output of comparator 110 is coupled to a counter 112. In one example, pixel array 102 is a two-dimensional (2D) array of photodiodes or image sensor pixels. In one example, photodiodes are arranged into a plurality of rows and a plurality of columns to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 102 has acquired its image data or image charge, the image charge information from the pixels are read out from pixel array 102 through column bitlines 108 and column amplifier circuitry 104. The comparator 110 of ADC circuitry 106 is coupled to receive the charge information from the pixels of pixel array 102 through column amplifier circuitry 104. In the depicted example, ADC circuitry 106 is a single slope ramp signal comparison type ADC to convert the amplitude of the image charge signal from column amplifier 104 into digital image data. In the ramp type ADC circuitry 106, the counter 112 starts to count when a ramp signal 116 from ramp generator 114 begins, which is compared to the image charge signal from column amplifier 104. At the point when the ramp signal 116 and the image charge signal are equal, the value of the counter 112 is latched as a digital representation of the analog image charge signal from column amplifier 104.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
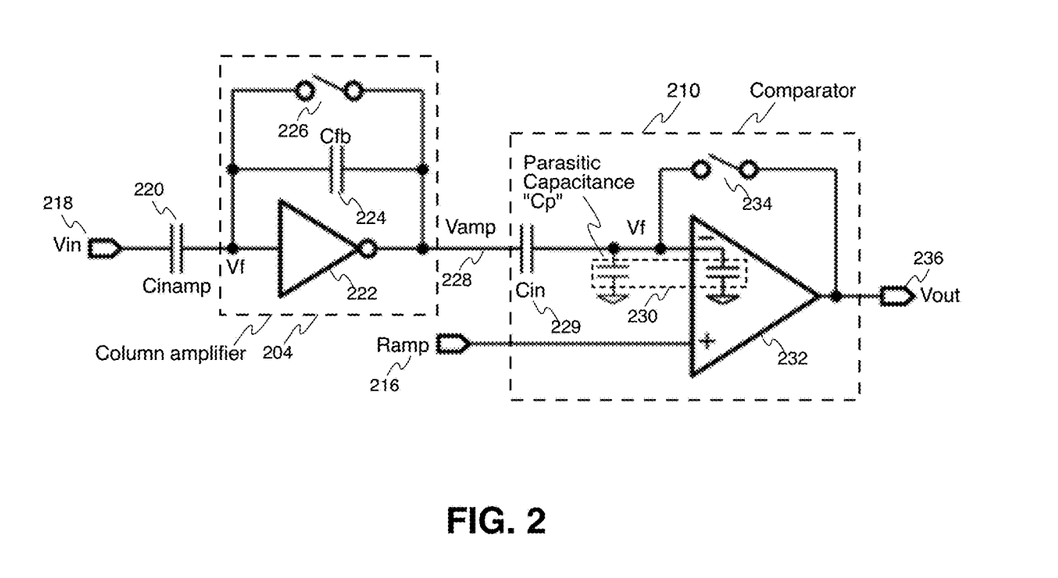
FIG. 2 illustrates an example schematic of a column amplifier with a comparator for use in an image sensor.

FIG. 2 illustrates an example schematic of a column amplifier 204 with a comparator 210 for use in an image sensor. As shown in the depicted example, column amplifier 204 includes an amplifier 222 coupled to receive an input voltage Vin 218 through an input capacitor Cinamp 220. In the example, a feedback capacitor Cfb 224 is coupled between the floating voltage Vf input of the of the amplifier 222 and the Vamp 228 voltage from the output of amplifier 222. In the example, an auto-zero switch 226 is also coupled between the floating voltage Vf input of the amplifier 222 and the Vamp 228 voltage from the output of amplifier 222. In operation, the column amplifier 204 is coupled to be reset in response to closing or turning on the auto-zero switch 226.

In the depicted example, comparator 210 is an ADC comparator that includes an internal comparator 232 having a non-inverting input ("+") coupled to receive a ramp signal 216. In the example, an inverting input ("−") of the internal comparator 232 is coupled to receive the Vamp 228 voltage from the output of amplifier 222 through an input capacitor Cin 229. The depicted example also illustrates an equivalent parasitic capacitance Cp 230 coupled to the inverting input of the internal comparator 232. As shown, the equivalent parasitic capacitance Cp 230 collectively includes wiring capacitance component on Vf and an equivalent input capacitance component of the internal comparator that are coupled between the inverting input of the internal comparator 232 and ground. In practice, it is appreciated that there are many capacitance components between Vf and many nodes other than ground such as Vout, Vramp, power lines, internal nodes of the comparator, etc., but in the depicted example, all of the capacitance components are coupled to ground for simplicity. In the example, an auto-zero switch 234 is also coupled between floating voltage Vf at the inverting input of the internal comparator 232 and the Vout 236 voltage from the internal comparator 232. In operation, the internal comparator 232 is coupled to be reset in response to closing or turning on the auto-zero switch 234.

In the example, it is noted that the existence of the input capacitor Cin 229 makes it possible to reset (auto-zero) the ADC comparator 210. In practice, however, the input capacitor Cin 229 occupies large area. Further, the floating node Vf being coupled to ground via the parasitic capacitance Cp causes the input referred noise of the comparator 210 to become worse because gain from the Vamp 228 voltage to the floating voltage Vf at the inverting input of the internal comparator 232 is reduced by parasitic capacitance Cp 230. For instance, the gain is given by the equation below:

$$A_f = \frac{C_{in}}{C_{in} + C_p} \quad (1)$$

where Af is the gain from the Vamp 228 voltage from the output of amplifier 222 to the floating voltage Vf at the inverting input of the internal comparator 232. As can be observed, the gain of comparator 232 is reduced depending on the ratio of Cin and Cp. If the input capacitance of input capacitor Cin 229 is larger, the gain $A_f$ can be increased at the expense of area and speed. In practice, it is appreciated that there may be some parasitic capacitance components between Vf and some other nodes such as Vout or some internal nodes of the comparator, but most parasitic capacitors on Vf reduce the gain in a similar way as the ones to ground.

Figure 3:
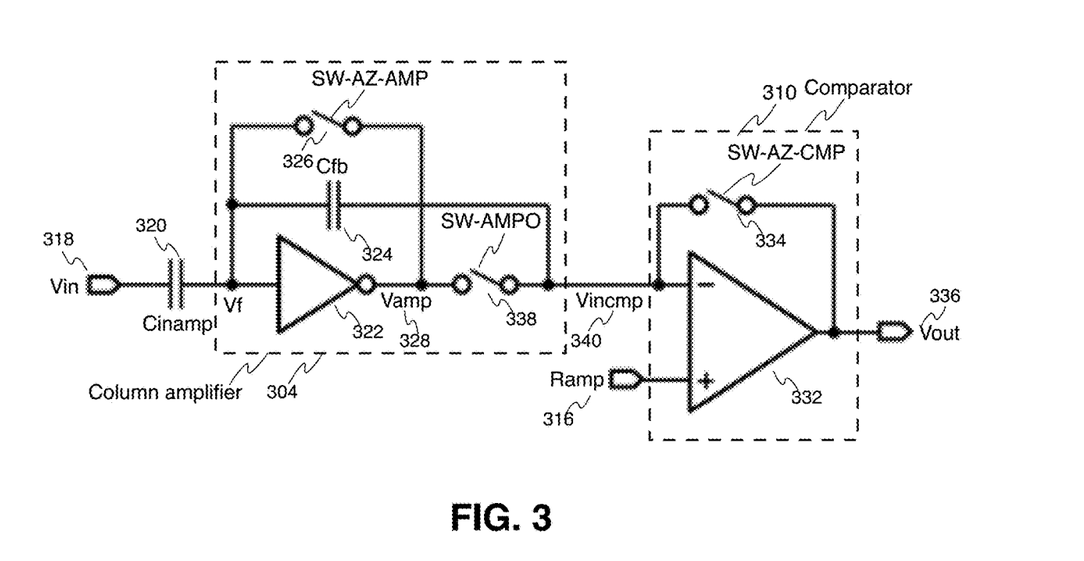
FIG. 3 illustrates an example schematic of a column amplifier with a comparator for use in an image sensor in accordance with the teachings of the present invention.

FIG. 3 illustrates an example schematic of a column amplifier 304 with a comparator 310 for use in an image sensor in accordance with the teachings of the present invention. It is appreciated that column amplifier 304 with a comparator 310 may be included in image sensor 100 of FIG. 1. As shown in the depicted example, column amplifier 304 includes an amplifier 322 coupled to receive an input voltage Vin 318 through an amplifier input capacitor Cinamp 320. In one example, input voltage 318 is an input signal representative of an image charge from a pixel cell of the image sensor, such as for example image sensor 100 of FIG. 1. In the example, an amplifier auto-zero switch 326 is coupled between a floating voltage Vf input of the amplifier 322 and a Vamp 328 voltage from the output of amplifier 322. In the depicted example, one end (e.g., an input end) of an amplifier output switch 338 is coupled to the Vamp 328 voltage from the output of amplifier 322, and a feedback capacitor Cfb 324 is coupled between the other end (e.g., an output end) of the amplifier output switch 338 and the floating voltage Vf input of the of the amplifier 322.

In the example shown in FIG. 3, comparator 310 is an ADC comparator that includes an internal comparator 332 having a non-inverting input ("+") coupled to receive a ramp signal 316. In the example, an inverting input ("−") of the internal comparator 332 is coupled to receive a Vincmp 340 voltage from the output end of the amplifier output switch 338. In the example, the feedback capacitor Cfb 324 is coupled between the Vincmp 340 voltage at the inverting input of the internal comparator 332 and the floating voltage Vf input of the of the amplifier 322. In addition, the amplifier output switch 338 is coupled between the Vamp 328 voltage from the output of amplifier 322 and the Vincmp 340 voltage at the inverting input of the internal comparator 332. Thus, when the amplifier output switch 338 is turned on or closed, the Vamp 328 voltage output of amplifier 322 is shorted to the Vincmp 340 voltage input of comparator 332. In the example, a comparator auto-zero switch 334 is also coupled between the Vincmp 340 voltage at the inverting input of the internal comparator 332 and the Vout 336 voltage from the internal comparator 332.

In operation, it is appreciated that the column amplifier 304 is reset using the Vout 336 output of the comparator 310, which enables an input capacitance for the comparator 310 to be removed in accordance with the teachings of the present invention. In other words, an input capacitance for comparator 310 is not required for the example shown in FIG. 3, compared to the example depicted in FIG. 2, where the existence of the input capacitor Cin 229 makes it possible to reset (auto-zero) the ADC comparator 210, as discussed above.

Figure 4:
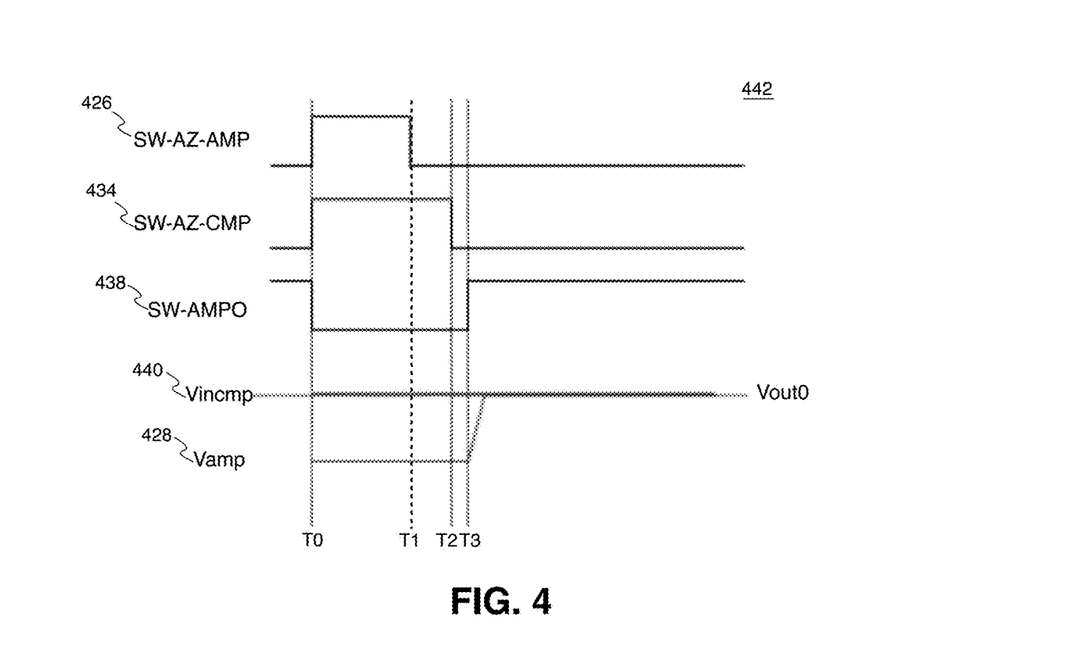
FIG. 4 illustrates an example timing diagram that shows examples of signals found in an example column amplifier with a comparator for use in an image sensor during an auto-zero sequence in accordance with the teachings of the present invention.

To illustrate, FIG. 4 illustrates an example timing diagram 442 that shows examples of signals found in an example column amplifier with a comparator for use in an image sensor during an auto-zero sequence in accordance with the teachings of the present invention. In particular, the timing diagram 442 of FIG. 4 shows how to reset the column amplifier and the comparator. It is noted that column amplifier and comparator referred to in the timing diagram 442 of FIG. 4 may be an example of column amplifier 304 and comparator 310 of FIG. 3, and that similarly named and numbered elements referenced below are coupled and function similar to as described above.

As shown in the example timing diagram 442 of in FIG. 4, at time T0, the SW-AZ-AMP 426 and SW-AZ-CMP 434 signals turn on the SW-AZ-AMP 326 and SW-AZ-CMP 334 switches, and the SW-AMPO 438 turns off the SW-AMPO switch in FIG. 3. As such, the floating voltage Vf input of the amplifier 322 is shorted or short circuited to Vamp 328 output of amplifier 322, the Vincmp 340 voltage at the inverting input of amplifier 322 is shorted or short circuited to the Vout 336 output voltage of comparator 332, and the Vamp 328 output of amplifier 322 is decoupled from the Vincmp 340 voltage at the inverting input of comparator 332 between time T0 and time T1. In this way, the column amplifier 304 and the comparator 310 are reset (auto-zeroed).

At time T1, the SW-AZ-AMP 426 signal turns off the SW-AZ-AMP switch 326, which decouples the floating voltage Vf input of amplifier 322 from the Vamp 328 output of amplifier 322. At time T2, the SW-AZ-CMP 434 signal turns off the SW-AZ-CMP 334 switch, which decouples the Vincmp 340 non-inverting input of comparator 332 from the Vout 336 output of comparator 332. At time T3, after the auto-zero or reset operation of the column amplifier with comparator is complete, the SW-AMPO 438 signal turns on the SW-AMPO 338 switch so that the Vamp 328 output of amplifier 322 is shorted or short circuited to the Vincmp 340 inverting input of comparator 332 through the SW-AMPO 338 switch.

Before turning on the SW-AMPO 338 switch at time T3, the Vincmp 440 voltage is approximately equal Vout0, which is the Vout 336 voltage during the auto-zero reset. At this time, the Vamp 428 voltage may be much different than Vout0. However, after turning on the SW-AMPO 338 switch at time T3, the Vamp 428 voltage approaches Vout0, depending on that closed loop gain of the amplifier 322 of column amplifier 304. The Vamp 428 voltage after the reset sequence is given by the equations below:

$$Vamp = \frac{A\beta}{A\beta + 1}(Vout0 - Vamp0) + Vamp0 \qquad (2)$$

where $$\beta = \frac{Cfb}{Cin + Cfb} \qquad (3)$$

Here, $-A$ is the open loop gain of the amplifier 322 of column amplifier 304, $\beta$ is the feedback factor given by the equation above, and Vamp0 is Vamp 428 voltage during the amplifier reset. The target voltage of Vincmp 440 after the auto-zero is Vout0. Accordingly, a target Verror can be expressed as:

$$Verror = Vamp - Vout0 = \frac{1}{A\beta + 1}(Vout0 - Vamp0) \qquad (4)$$

In practice, the target Verror can be small enough in actual design. For example, if the open loop gate A is 80 dB and the feedback factor $\beta$ is −18 dB, the error in the Vamp 428 reset level will be less than 0.1% of Vout0-Vamp0. In one example, Vout0-Vamp0 may be approximately 300 mV, and the error may be approximately 0.3 mV. Typically, the ADC range at lowest gain is larger than 100 mV, and therefore, a 0.3 mV of error is small enough.

Figure 5:
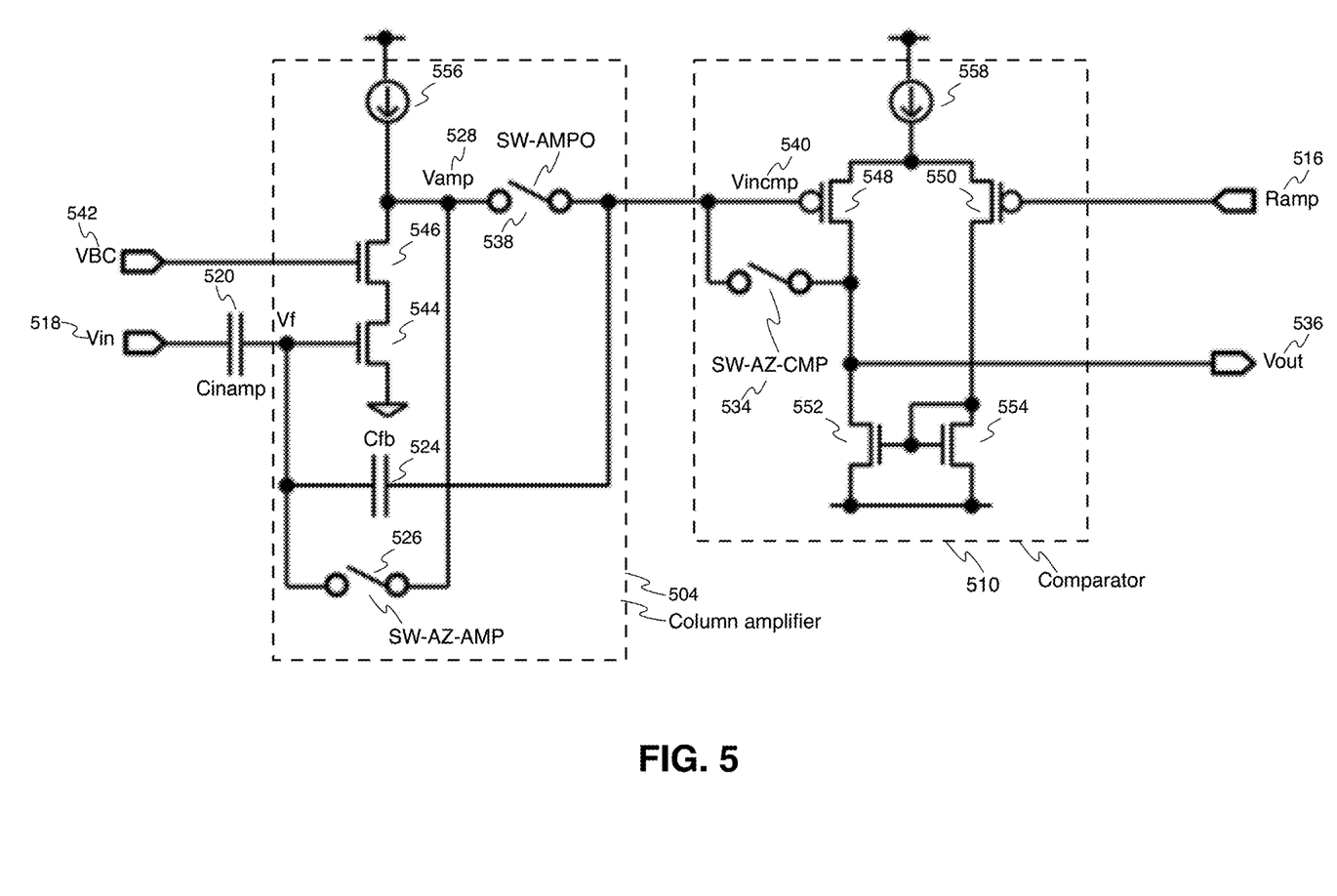
FIG. 5 illustrates another example schematic of a column amplifier with a comparator for use in an image sensor in accordance with the teachings of the present invention.

FIG. 5 illustrates another example schematic of a column amplifier 504 with a comparator 510 for use in an image sensor in accordance with the teachings of the present invention. For instance, it is appreciated that column amplifier 504 with a comparator 510 may be included in image sensor 100 of FIG. 1. It is appreciated that the column amplifier 504 and comparator 510 of FIG. 5 may be another example of the column amplifier 304 and comparator 310 of FIG. 3 example discussed previously, and that similarly named and numbered elements referenced below are coupled and function similar to as described above. However, FIG. 5 shows an example transistor level schematic of the column amplifier 504 and comparator 510. As shown in the depicted example, column amplifier 504 includes an NMOS common source amplifier, which includes an input device 544. In in the example, input device 544 is an NMOS device, and in another example, it is appreciated that input device 544 may be a PMOS device. Input device 544 is coupled to receive an input voltage Vin 518 through an amplifier input capacitor Cinamp 520. In one example, input voltage 518 is an input signal representative of an image charge from a pixel cell of the image sensor, such as for example image sensor 100 of FIG. 1. Input device 544 is coupled to an NMOS cascode device 546, which is coupled to an output Vamp 528 voltage node of column amplifier 504 and column amplifier current source 556. NMOS cascode device 546 is coupled to be biased with a bias signal VBC 542. As shown in the depicted example, the amplifier auto-zero switch 526 is coupled between a floating voltage Vf input of input device 544 and the output Vamp 528 voltage node of column amplifier 504. In the depicted example, one end (e.g., an input end) an amplifier output switch 538 is coupled to the output Vamp 528 voltage node of column amplifier 504. A feedback capacitor Cfb 524 is coupled between the other end (e.g., an output end) of the amplifier output switch 538 and the floating voltage Vf input of the input device 544.

In the example shown in FIG. 5, comparator 510 includes a comparator current source 558 coupled to a first comparator input device 548 and a second comparator input device 550. In the depicted example, the first and second comparator input devices 548 and 550 are PMOS input transistors. In another example, it is appreciated that input devices 548 and 550 may be NMOS input transistors. Input device 548 has a gate terminal coupled to receive the input Vincmp 540 from the output end of amplifier output switch 538, and input device 550 has a gate terminal coupled to receive the ramp signal 516. In the example, when the amplifier output switch 538 is turned on or closed, the Vamp 528 voltage of column amplifier 504 is shorted to the Vincmp 540 voltage input of first comparator input device 548. A current mirror including transistors 552 and 554 is coupled to input devices 548 and 550, respectively. The Vout 536 voltage output of comparator 510 is coupled to an output node between input device 548 and transistor 552. In the example, a comparator auto-zero switch 534 is also coupled between the Vincmp 540 voltage at the input of input device 548 and the Vout 536 voltage at the output node between input device 548 and transistor 552, as shown. In operation, the comparator auto-zero switch 534 is turned on or closed during a reset or auto-zero operation.

In the example depicted in FIG. 5, it is noted that the Vincmp 540 voltage becomes approximately equal to the ramp signal 516 voltage during reset. There may be a small difference caused by offset that comes from transistor mismatch, infinite gain of the comparator 510, etc. As such, the Vamp 528 and the Vincmp 540 voltages after the reset sequence can be controlled by ramp 516 voltage during a comparator reset operation. The ramp signal 516 voltage during comparator reset can be selected to make all devices work in saturation region in accordance with the teachings of the present invention.

Figure 6A:
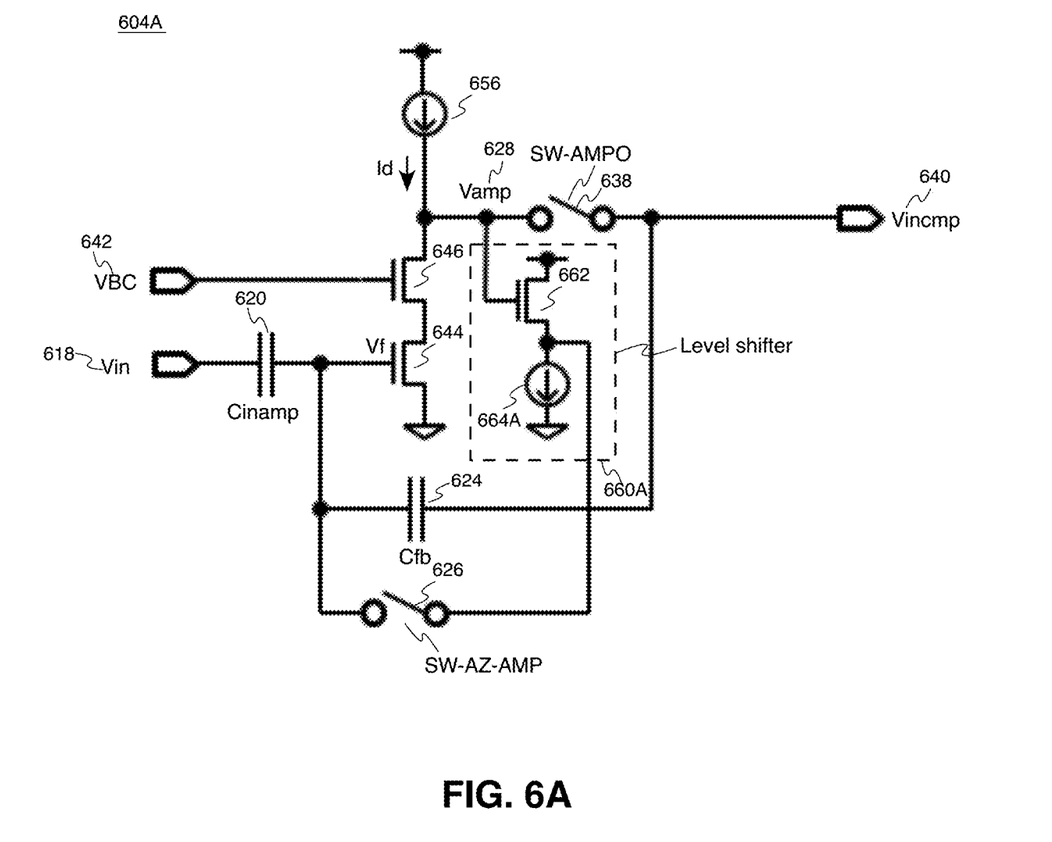
FIG. 6A illustrates an example schematic of a column amplifier with a level shifter in accordance with the teachings of the present invention.

FIG. 6A illustrates an example schematic of a column amplifier 604A with a level shifter 660A in accordance with the teachings of the present invention. It is appreciated that the column amplifier 604A of FIG. 6A is shares similarities with the column amplifier 504 depicted in FIG. 5. Accordingly, similar details of column amplifier 604A of FIG. 6A will not be described again in detail for the sake of brevity. In addition, it is appreciated that column comparator 604A may be included in or utilized with an analog to digital converter (ADC), such as for example ADC 106 of FIG. 1. As shown in the depicted example, column amplifier 604A includes a level shifter 660A coupled between the Vamp 628 voltage node of column amplifier 604A and the amplifier auto-zero switch 626, which is also coupled to the floating voltage Vf input of the of the input device 644. In the example, the level shifter 660A includes a source follower 662 that works as a level shifter. In the example, the source follower 662 is coupled to a level shifter current source 664A as shown. In the example, the gate input of the source follower 662 is coupled to the Vamp 628 voltage node of column amplifier 604A, and output of the source follower 662 of level shifter 660 is coupled to the amplifier auto-zero switch 626.

Figure 6B:
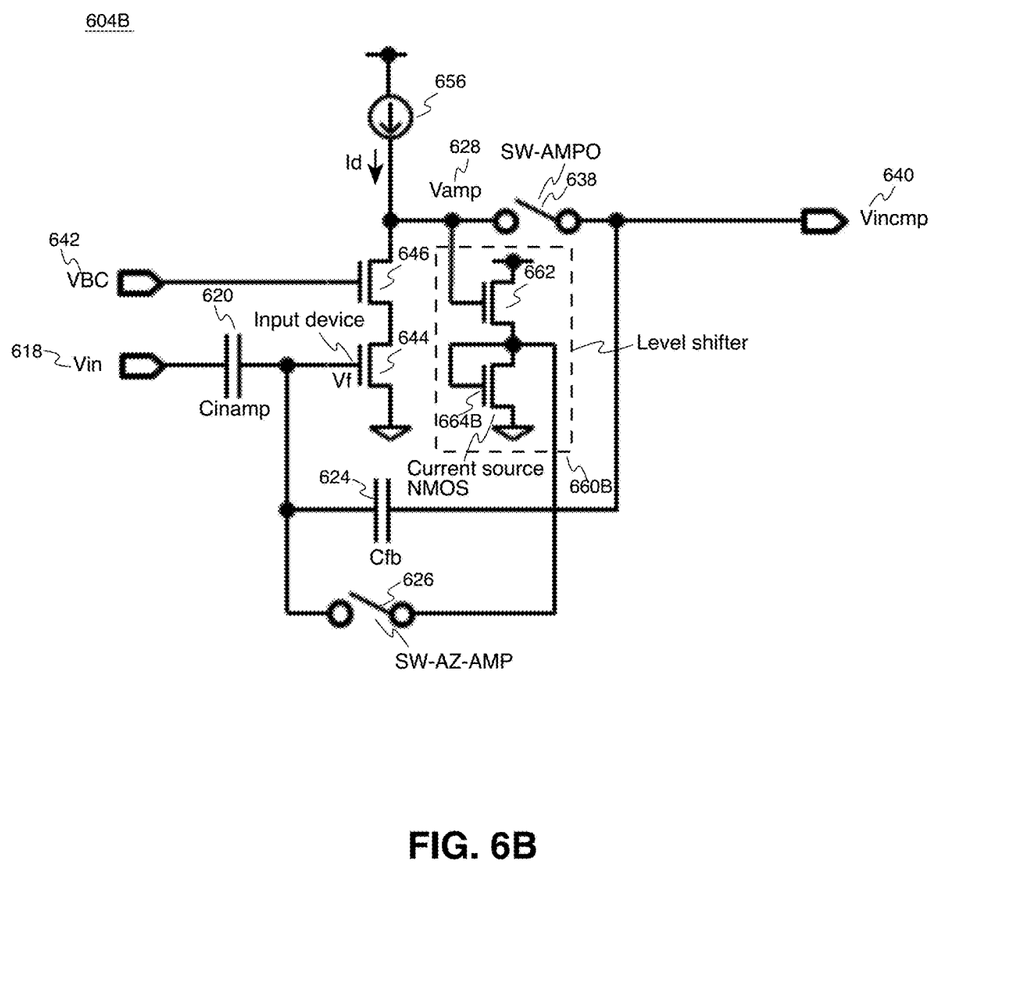
FIG. 6B illustrates another example schematic of a column amplifier with a level shifter in accordance with the teachings of the present invention.

FIG. 6B illustrates another example schematic of a column amplifier with a level shifter in accordance with the teachings of the present invention. It is appreciated that the column amplifier 604B of FIG. 6B is shares similarities with the column amplifier 504 depicted in FIG. 5 and/or the column amplifier 604A of FIG. 6A. Accordingly, similar details of column amplifier 604B of FIG. 6B will not be described again in detail or the sake of brevity. In addition, it is appreciated that column comparator 604B may also be included in or utilized with an analog to digital converter (ADC), such as for example ADC 106 of FIG. 1. As shown in the depicted example, column amplifier 604B includes a level shifter 660B coupled between the Vamp 628 voltage node of column amplifier 604B and the amplifier auto-zero switch 626, which is also coupled to the floating voltage Vf input of the of the input device 644. In the example, the level shifter 660B includes a source follower 662 that works as a level shifter. In the example, the source follower 662 is coupled to a level shifter current source 664B as shown. In the example, the gate input of the source follower 662 is coupled to the Vamp 628 voltage node of column amplifier 604A, and output of the source follower 662 of level shifter 660 is coupled to the amplifier auto-zero switch 626. As shown, the level shifter current source 664B in the level shifter 660B is shown being implemented as an NMOS current source coupled to source follower input device 662. In other words, the level shifter current source 664A shown in FIG. 6A is replaced by a NMOS device 664B in FIG. 6B. The gate and drain of the NMOS device 664B are coupled to the output of the source follower 662.

With respect to the examples illustrated in FIGS. 6A-6B, during auto-zero, when the amplifier output switch 636 is turned on or closed, the level shifter current source 664A/664B and the input device 644 operate as a current mirror. In addition, the floating voltage Vf input and the Vamp 628 voltage node are determined to match the drain current of the input device 644 with bias current Id from the current source 656. As such, the bias current Id of the source follower can be determined by W/L ratio of the input device 644 and NMOS level shifter current source 664B in the level shifter 660B. For instance, if the W/L of the level shifter current source NMOS 664B is 1/m that of the input device 644, the bias current Id of the input device 644 becomes Id/m.

Figure 7:
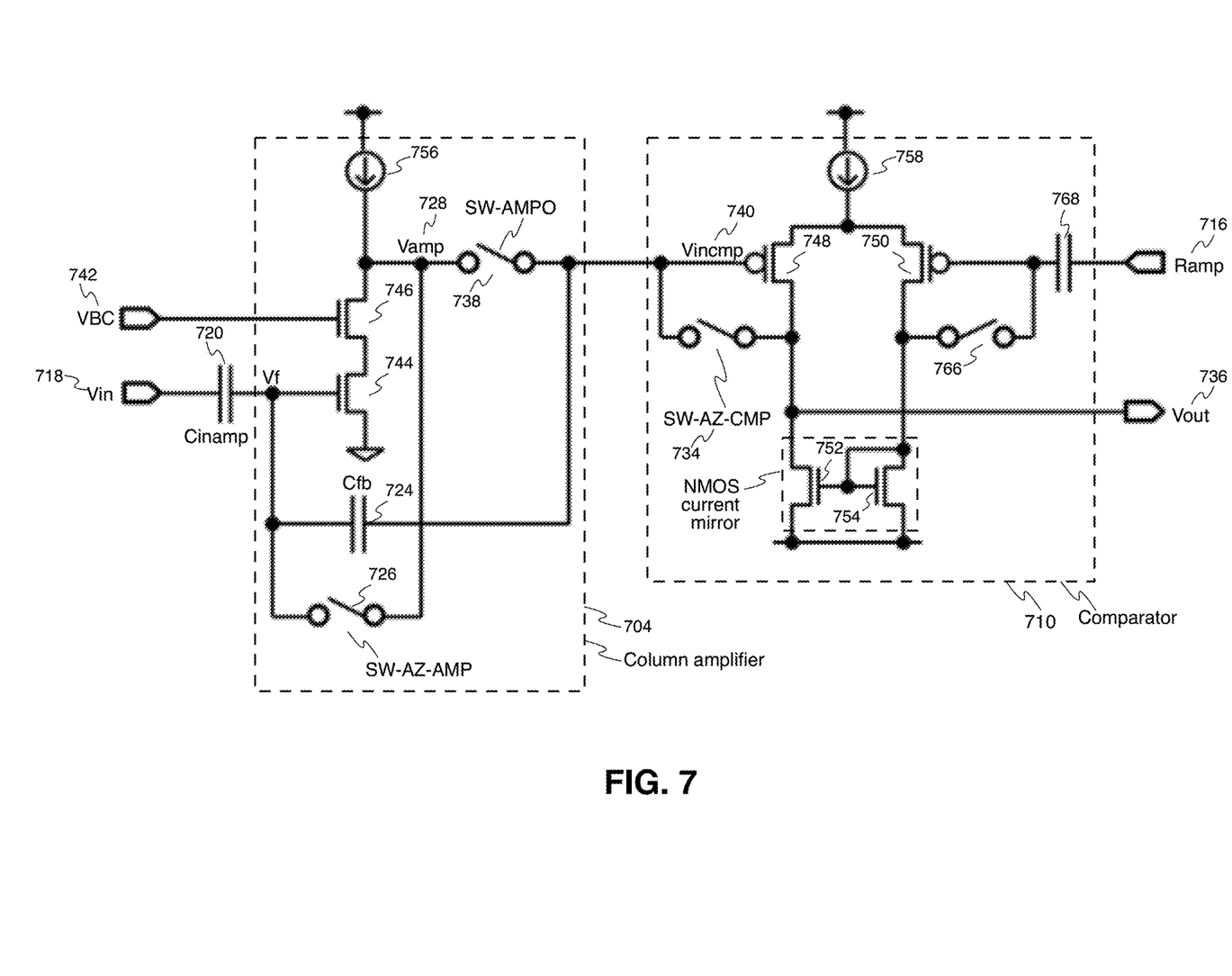
FIG. 7 illustrates another example schematic of a column amplifier with a comparator for use in an image sensor in accordance with the teachings of the present invention.

FIG. 7 illustrates another example schematic of a column amplifier 704 with a comparator 710 for use in an image sensor in accordance with the teachings of the present invention. For instance, it is appreciated that column amplifier 704 with a comparator 710 may be included in image sensor 100 of FIG. 1. In addition, it is appreciated that the column amplifier 704 and comparator 710 of FIG. 7 may be another example of the column amplifier 504 and comparator 510 of FIG. 5, and/or of the column amplifier 304 and comparator 310 of FIG. 3 discussed previously, and that similarly named and numbered elements referenced below are coupled and function similar to as described above.

As shown in the depicted example, column amplifier 704 includes an NMOS common source amplifier, which includes an input device 744. In in the example, input device 744 is an NMOS device, and in another example, it is appreciated that input device 744 may be a PMOS device. Input device 744 is coupled to receive an input voltage Vin 718 through an amplifier input capacitor Cinamp 720. In one example, input voltage 718 is an input signal representative of an image charge from a pixel cell of the image sensor, such as for example image sensor 100 of FIG. 1. Input device 744 is coupled to an NMOS cascode device 746, which is coupled to an output Vamp 728 voltage node of column amplifier 704 and column amplifier current source 756. NMOS cascode device 746 is coupled to be biased with a bias signal VBC 742. As shown in the depicted example, the amplifier auto-zero switch 726 is coupled between a floating voltage Vf input of input device 744 and the output Vamp 728 voltage node of column amplifier 704. In the depicted example, one end (e.g., an input end) of an amplifier output switch 738 is coupled to the output Vamp 728 voltage node of column amplifier 704. A feedback capacitor Cfb 724 is coupled between the other end (e.g., an output end) of the amplifier output switch 738 and the floating voltage Vf input of the input device 744.

In the example shown in FIG. 7, comparator 710 includes a current source 758 coupled to a first input device 748 and a second input device 750. In the depicted example, the first and second comparator input devices 748 and 750 are PMOS transistors. In another example, it is appreciated that input devices 748 and 750 may be a NMOS devices. Input device 748 is coupled to receive the input Vincmp 740 from the output end of the amplifier output switch 738, and input device 750 is AC coupled to receive the ramp signal 716 through capacitor 768. In the example, when the amplifier output switch 738 is turned on or closed, the Vamp 728 voltage of column amplifier 704 is shorted to the Vincmp 740 voltage input of first input device 748. An NMOS current mirror including transistors 752 and 754 is coupled to input devices 748 and 750, respectively. The Vout 736 voltage output of comparator 710 is coupled to an output node between input device 748 and transistor 752. In the depicted example, a comparator auto-zero switch 1 766 is coupled between an input terminal or gate of input device 750 and a node between input device 750 and transistor 754 of the NMOS current mirror that includes transistors 752 and 754 as shown. In the example, a comparator auto-zero switch2 734 is also coupled between the Vincmp 740 voltage at the input of input device 748 and the Vout 736 voltage at the output node between input device 748 and transistor 752, as shown. In operation, the comparator auto-zero switches 766 and 734 are controlled by "SW-AZ-CMP" and are turned on or closed during a reset or auto-zero operation.

As summarized above, it is appreciated that the second input device 750 is AC coupled to receive the ramp signal 716 through capacitor 768. In this way, the comparator 710 can be reset not depending on ramp signal 716 voltage. In this configuration, the Vamp 728 voltage and the Vincmp 740, after a reset sequence, can be determined by the gate source voltage Vgs of transistors 752 and 754 of the NMOS current mirror during a reset of the comparator 710. As such, in one example, the transistor sizes are selected to make the devices in the column amplifier 704 operate in the saturation region. In another example, the gate source voltage Vgs of the transistors 752 and 754 of the NMOS current mirror can be changed during and after the reset sequence to change the W/L ratio.

Figure 8:
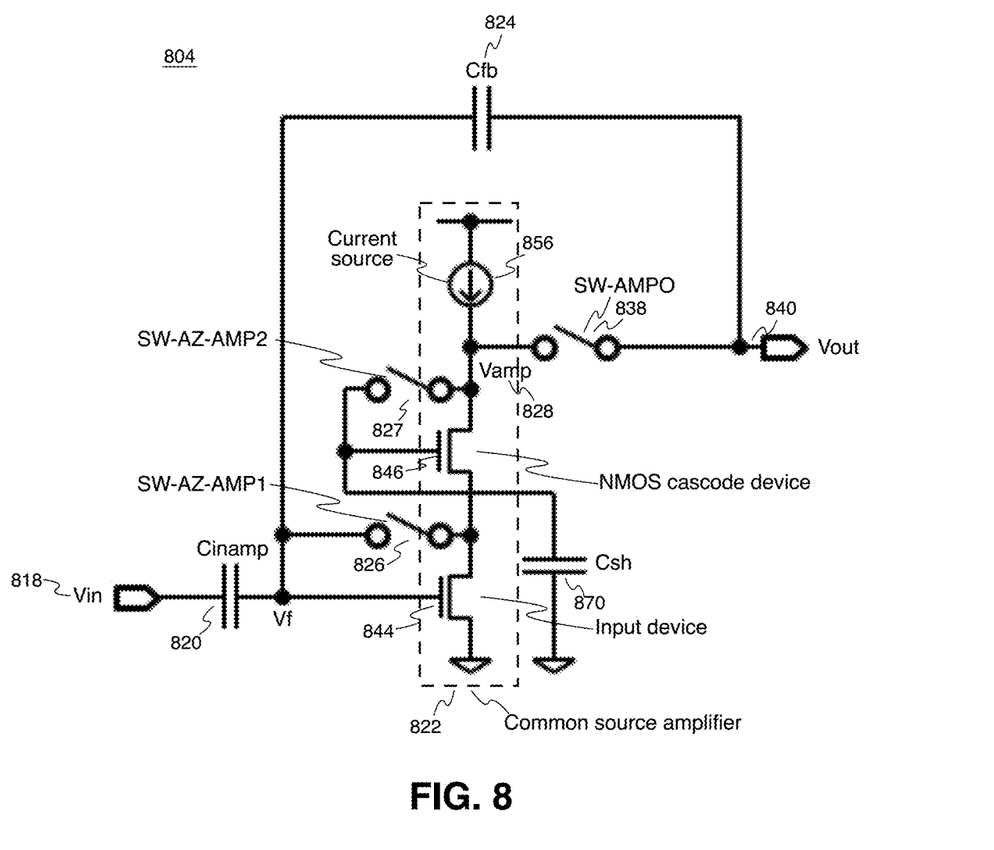
FIG. 8 illustrates an example schematic of a column amplifier with a plurality of auto-zero switches with a plurality of auto-zero switches in accordance with the teachings of the present invention.

FIG. 8 illustrates an example schematic of a column amplifier 804 with a plurality of auto-zero switches in accordance with the teachings of the present invention. It is appreciated that the column amplifier 804 may be another example of the column amplifier examples previously, and that similarly named and numbered elements referenced below are coupled and function similar to as described above. For instance, as shown in the example depicted in FIG. 8, column amplifier 804 includes a common source amplifier 822 that includes an input device 844 coupled to an NMOS cascode device 846, which is coupled to a current source 856 as shown. Input device 844 is coupled to receive an input voltage Vin 818 through an amplifier input capacitor Cinamp 820. In one example, input voltage 818 is an input signal representative of an image charge from a pixel cell of the image sensor, such as for example image sensor 100 of FIG. 1.

In the example, a first amplifier auto-zero switch 826 is coupled between a floating voltage Vf input of input device 844 and a node between the input device 844 and the NMOS cascode device 846. As such, the first amplifier auto-zero switch 826 is coupled between a floating voltage Vf input of input device 844 and the output Vamp 828 voltage node of column amplifier 804 through NMOS cascode device 846. One end (e.g., an input end) of an amplifier output switch 838 is coupled to the Vamp 828 voltage node of column amplifier 804. A feedback capacitor Cfb 824 is coupled between the other end (e.g., an output end) of the amplifier output switch 838 and the floating voltage Vf input of the input device 844. In addition, a second amplifier auto-zero switch 827 is coupled between the Vamp 828 voltage node and a gate terminal of the NMOS cascode device 846. A sample and hold capacitor Csh 870 is coupled between the gate terminal of the NMOS cascode device 840 and ground.

Figure 9:
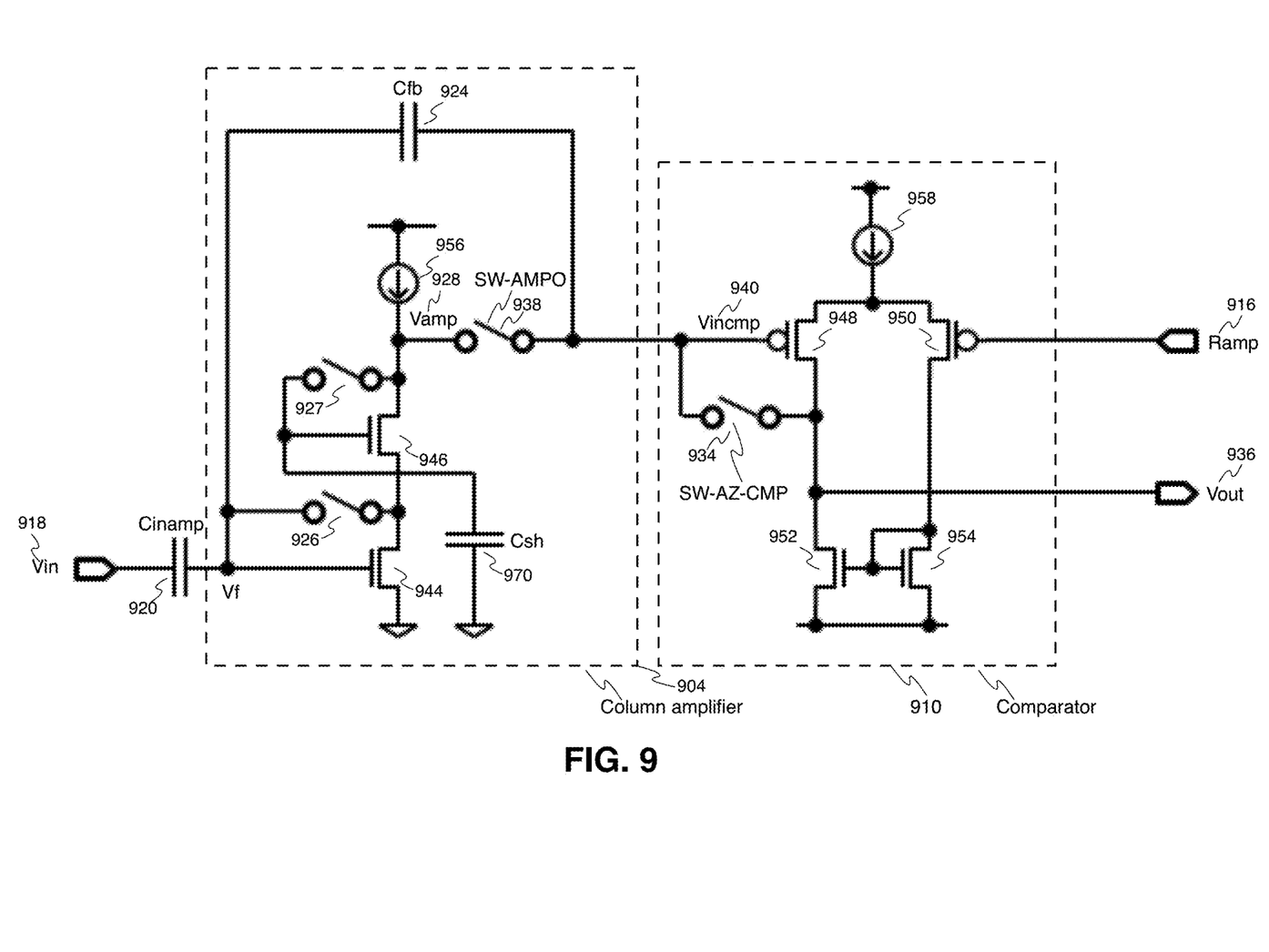
FIG. 9 illustrates an example schematic of a column amplifier with a comparator for use in an image sensor in accordance with the teachings of the present invention.

FIG. 9 illustrates another example schematic of a column amplifier 904 with a comparator 910 for use in an image sensor in accordance with the teachings of the present invention. It is appreciated that column amplifier 904 with comparator 910 may be included in image sensor 100 of FIG. 1. It is further appreciated that the column amplifier 904 of FIG. 9 is shares similarities with the column amplifier examples discussed previously, such as column amplifier 804 depicted in FIG. 8, and that comparator 910 of FIG. 9 shares similarities with the comparators discussed previously, such as comparator 510 depicted in FIG. 5.

For instance, as shown in the example depicted in FIG. 9, column amplifier 904 includes a common source amplifier that includes an input device 944 coupled to an NMOS cascode device 946, which is coupled to the Vamp 928 voltage node of column amplifier 904 and to a current source 956 as shown. Input device 944 is coupled to receive an input voltage Vin 918 through an amplifier input capacitor Cinamp 920. A first amplifier auto-zero switch 926 is coupled between a floating voltage Vf input of input device 944 and a node between the input device 944 and the NMOS cascode device 946. As such, the first amplifier auto-zero switch 926 is coupled between a floating voltage Vf input of input device 944 and the output Vamp 928 voltage node of column amplifier 904 through NMOS cascode device 946. One end (e.g., an input end) of an amplifier output switch 938 is coupled to the Vamp 928 voltage node of column amplifier 904. A feedback capacitor Cfb 924 is coupled between the other end (e.g., an output end) of the amplifier output switch 938 and the floating voltage Vf input of the input device 944. In addition, a second amplifier auto-zero switch 927 is coupled between the Vamp 928 voltage node and a gate terminal of the NMOS cascode device 946. A sample and hold capacitor Csh 970 is coupled between the gate terminal of the NMOS cascode device 940 and ground.

Continuing with the example shown in FIG. 9, comparator 910 includes a comparator current source 958 coupled to a first comparator input device 948 and a second comparator input device 950. In the depicted example, the first and second comparator input devices 948 and 950 are PMOS input transistors. In another example, it is appreciated that input devices 948 and 950 may be NMOS input transistors. Input device 948 has a gate terminal coupled to receive the input Vincmp 940 from the output end of amplifier output switch 938, and input device 950 has a gate terminal coupled to receive the ramp signal 916. In the example, when the amplifier output switch 938 is turned on or closed, the Vamp 928 voltage of column amplifier 904 is shorted to the Vincmp 940 voltage input of first comparator input device 948. A current mirror including transistors 952 and 954 is coupled to input devices 948 and 950, respectively. The Vout 936 voltage output of comparator 910 is coupled to an output node between input device 948 and transistor 952. In the example, a comparator auto-zero switch 934 is also coupled between the Vincmp 940 voltage at the input of input device 948 and the Vout 936 voltage at the output node between input device 948 and transistor 952, as shown. In operation, the comparator auto-zero switch 934 is turned on or closed during a reset or auto-zero operation.

Figure 10:
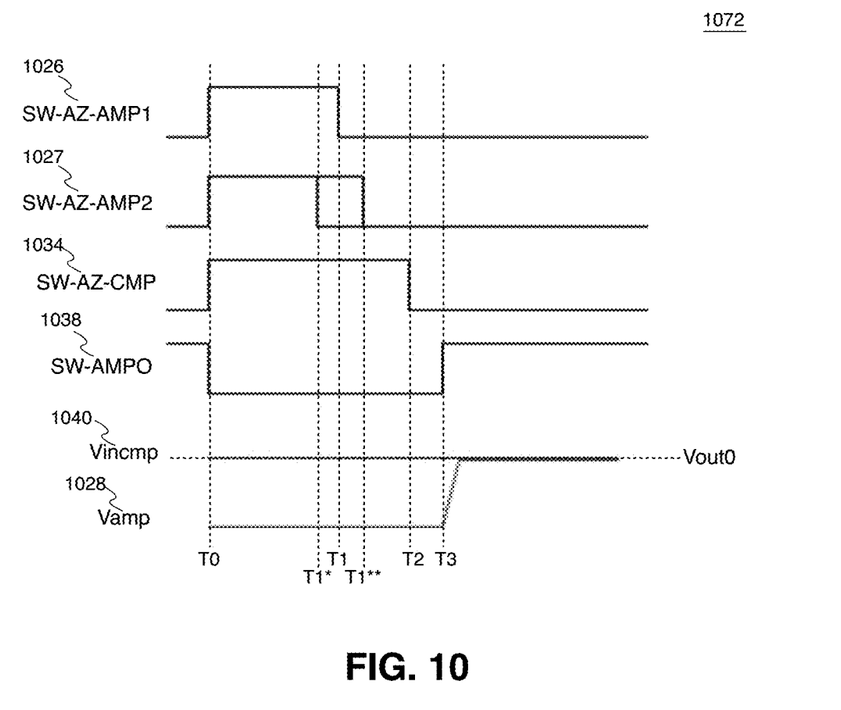
FIG. 10 illustrates an example timing diagram that shows examples of signals found in an example column amplifier with a plurality of auto-zero switches with a comparator for use in an image sensor during an auto-zero sequence in accordance with the teachings of the present invention.

FIG. 10 illustrates an example timing diagram 1072 includes that shows examples of signals found in an example column amplifier with a plurality of auto-zero switches with a comparator during an reset sequence in accordance with the teachings of the present invention. It is noted that the column amplifier and comparator signals referred to in the timing diagram 1072 of FIG. 10 may from the example of column amplifier 904 and comparator 910 of FIG. 9, and that similarly named and numbered elements referenced below are coupled and function similar to as described above.

As shown in the example timing diagram 1072 of in FIG. 10, at time T0, the SW-AZ-AMP1 1026, SW-AZ-AMP2 1027, and SW-AZ-CMP 1034 signals turn on the first auto-zero switch 926, the second auto-zero switch 927, and the comparator auto-zero switch 934, and the SW-AMPO 1038 signal turns off the amplifier output switch 938 in FIG. 9. As such, the floating voltage Vf input of the input device 944 is shorted or short circuited to the node between input device 944 and NMOS cascode device 946, and the Vamp 928 voltage node is shorted or short circuited to the gate of NMOS cascode device 946 and the sample and hold capacitor Csh 970. In addition, the Vincmp 940 voltage at the first comparator input device 948 is shorted or short circuited to the Vout 936 output voltage of comparator 910, and the Vamp 928 voltage node is decoupled from the Vincmp 940 voltage at the first comparator input device 948 between time T0 and time T1. In this way, the column amplifier 904 and the comparator 910 are reset (auto-zeroed).

At time T1, the SW-AZ-AMP1 1026 signal turns off the first auto-zero switch 926, which decouples the floating voltage Vf input of input device 944 from the node between the input device 944 and the NMOS cascode device 946. The example shown in FIG. 10 also shows that the SW-AZ-AMP2 1027 signal turns off the second auto-zero switch 927 at time T1* or at time T1, which decouples the Vamp 928 voltage node from the gate of NMOS cascode device 946 and the sample and hold capacitor Csh 970**. It is noted that the time T1* and the T1 timing of turning off the SW-AZ-AMP2 1027 signal is almost the same as the time T1 timing of turning off the SW-AZ-AMP1 1026 signal but is slightly different because of skew. In another example, it is appreciated that a single signal SW-AZ-AMP can be used to control both of auto-zero switches SW-AZ-AMP1 1026 and SW-AZ-AMP2 1027**.

At time T2, the SW-AZ-CMP 1034 signal turns off the comparator auto-zero switch 934, which decouples the Vincmp 1040 input of the first comparator input device 948 from the Vout 1036 output of comparator 910. At time T3, after the auto-zero or reset operation of the column amplifier with comparator is complete, the SW-AMPO 1038 signal turns on the amplifier output switch 938 switch so that the Vamp 928 output of column amplifier 904 is shorted or short circuited to the Vincmp 940 of first comparator input device 948 through the amplifier output switch 938.

Before turning on the amplifier output switch 938 at time T3, the Vincmp 1040 voltage is approximately equal Vout0, which is the Vout 936 voltage during the auto-zero reset. At this time, the Vamp 1028 voltage may be much different than Vout0. However, after turning on the amplifier output switch 938 at time T3, the Vamp 1028 voltage approaches Vout0, depending on that closed loop gain of column amplifier 904.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A column amplifier with a comparator for use in an image sensor, comprising:
   an amplifier coupled to receive an input signal representative of an image change from a pixel cell of the image sensor; an amplifier auto-zero switch coupled between an input of the amplifier and an output of the amplifier;
   a feedback capacitor coupled to an input of the amplifier;
   an amplifier output switch coupled between the output of the amplifier and the feedback capacitor; a comparator having a first input coupled to the amplifier switch; and
   a comparator auto-zero coupled between the first input of the comparator and an output of the comparator.

2. The column amplifier with the comparator of claim 1, wherein the amplifier is coupled to receive the input signal through an amplifier input capacitor.

3. The column amplifier with the comparator of claim 1,
   wherein the amplifier auto-zero switch and the comparator auto-zero switch are configured to be turned on and the amplifier output switch is configured to be turned off during an auto-zero operation of the column amplifier with the comparator, and
   wherein the amplifier auto-zero switch and the comparator auto-zero switch are configured to be turned off and the amplifier output switch is configured to be turned on after the auto-zero operation of the column amplifier with the comparator is complete.

4. The column amplifier with the comparator of claim 3, wherein the first input of the comparator is shorted to the output of the amplifier when the amplifier output switch is turned on.

5. The column amplifier with the comparator of claim 1, wherein the amplifier is a common source amplifier including an input device.

6. The column amplifier with the comparator of claim 5, wherein the common source amplifier further comprises a cascode device coupled to the input device, wherein the cascode device is coupled between the output of the comparator and the input device.

7. The column amplifier with the comparator of claim 6, wherein the common source amplifier further comprises a column amplifier current source coupled to the cascode device.

8. The column amplifier with the comparator of claim 6, where the amplifier auto-zero switch is a first amplifier auto-zero switch; wherein the first amplifier auto-zero switch is coupled between the input of the common source amplifier and the output of the common source amplifier through the cascode device.

9. The column amplifier with the comparator of claim 8, further comprising a second amplifier auto-zero switch coupled between a gate terminal of the cascode device and the output of the common source amplifier.

10. The column amplifier with the comparator of claim 9,
wherein the first amplifier auto-zero switch, the second amplifier auto-zero switch, and the comparator auto-zero switch are configured to be turned on and the amplifier output switch is configured to be turned off during an auto-zero operation of the column amplifier with the comparator, and
wherein the first amplifier auto-zero switch, the second amplifier auto-zero switch, and the comparator auto-zero switch are configured to be turned off and the amplifier output switch is configured to be turned on after the auto-zero operation of the column amplifier with the comparator is complete.

11. The column amplifier with the comparator of claim 1, wherein the comparator has a second input coupled to receive a ramp signal.

12. The column amplifier with the comparator of claim 11, wherein the comparator comprises:
a first input transistor, wherein a gate of the first input transistor is the first input of the comparator;
a second input transistor, wherein a gate of the second input transistor is the second input of the comparator; and
a current mirror coupled to the first input transistor and the second input transistor, wherein the output of the comparator is coupled to an output node between the first input transistor and the current mirror.

13. The column amplifier with the comparator of claim 12, wherein the comparator further comprises a comparator current source coupled to the first input transistor and the second input transistor, wherein the first input transistor and the second input transistor are coupled between the comparator current source and the current mirror.

14. The column amplifier with the comparator of claim 7, further comprising a level shifter coupled between the output of the amplifier and the amplifier auto-zero switch.

15. The column amplifier with the comparator of claim 14, wherein the level shifter comprises:
a source follower having a gate coupled to the output of the amplifier; and
a level shifter current source coupled to the source follower.

16. The column amplifier with the comparator of claim 15, wherein the level shifter current source comprises an NMOS current source.

17. The column amplifier with the comparator of claim 11, wherein the second input of the comparator is AC coupled to receive the ramp signal through a capacitor.

18. The column amplifier with the comparator of claim 13, wherein the comparator further comprises a switch coupled between the gate of the second input transistor and a node between the second input transistor and the current mirror.

19. An imaging system, comprising:
a pixel array including a plurality of pixel cells;
a column amplifier with comparator coupled to the pixel array to read out image charge information from the pixel array, wherein the column amplifier with comparator comprises:
an amplifier coupled to receive an input signal representative of an image charge from one of the pixel cells of the pixel array; an amplifier auto-zero switch coupled between an input of the amplifier and an output of the amplifier; a feedback capacitor coupled to an input of the amplifier; an amplifier output switch coupled between the output of the amplifier and the feedback capacitor;
a comparator having a first input coupled to the amplifier output switch; and
a comparator auto-zero switch coupled between the first input of the comparator and an output of the comparator.

20. The imaging system of claim 19, further comprising a counter coupled to an output of the comparator.

21. The imaging system of claim 19, further comprising a ramp generator coupled to generate a ramp signal coupled to be received by a second input of the comparator.

22. The imaging system of claim 19, wherein the amplifier is coupled to receive the input signal through an amplifier input capacitor.

23. The imaging system of claim 19,
wherein the amplifier auto-zero switch and the comparator auto-zero switch are configured to be turned on and the amplifier output switch is configured to be turned off during an auto-zero operation of the column amplifier with the comparator, and
wherein the amplifier auto-zero switch and the comparator auto-zero switch are configured to be turned off and the amplifier output switch is configured to be turned on after the auto-zero operation of the column amplifier with the comparator is complete.

24. The imaging system of claim 23, wherein the first input of the comparator is shorted to the output of the amplifier when the amplifier output switch is turned on.

25. The imaging system of claim 19, wherein the amplifier is a common source amplifier including an input device.

26. The imaging system of claim 25, wherein the common source amplifier further comprises a cascode device coupled to the input device, wherein the cascode device is coupled between the output of the comparator and the input device.

27. The imaging system of claim 26, wherein the common source amplifier further comprises a column amplifier current source coupled to the cascode device.

28. The imaging system of claim 26, where the amplifier auto-zero switch is a first amplifier auto-zero switch; wherein the first amplifier auto-zero switch is coupled between the input of the common source amplifier and the output of the common source amplifier through the cascode device.

29. The imaging system of claim 28, wherein the column amplifier with comparator further comprises a second amplifier auto-zero switch coupled between a gate terminal of the cascode device and the output of the common source amplifier.

30. The imaging system of claim 29,
wherein the first amplifier auto-zero switch, the second amplifier auto-zero switch, and the comparator auto-zero switch are configured to be turned on and the amplifier output switch is configured to be turned off during an auto-zero operation of the column amplifier with the comparator, and wherein the first amplifier auto-zero switch, the second amplifier auto-zero switch, and the comparator auto-zero switch are configured to be turned off and the amplifier output switch is configured to be turned on after the auto-zero operation of the column amplifier with the comparator is complete.

31. The imaging system of claim 21, wherein the comparator comprises:
a first input transistor, wherein a gate of the first input transistor is the first input of the comparator;
a second input transistor, wherein a gate of the second input transistor is the second input of the comparator; and
a current mirror coupled to the first input transistor and the second input transistor, wherein the output of the comparator is coupled to an output node between the first input transistor and the current mirror.

32. The imaging system of claim 31, wherein the comparator further comprises a comparator current source coupled to the first input transistor and the second input transistor, wherein the first input transistor and the second input transistor are coupled between the comparator current source and the current mirror.

33. The imaging system of claim 27, wherein the column amplifier further comprises a level shifter coupled between the output of the amplifier and the amplifier auto-zero switch.

34. The imaging system of claim 33, wherein the level shifter comprises:
a source follower having a gate coupled to the output of the amplifier; and
a level shifter current source coupled to the source follower.

35. The imaging system of claim 34, wherein the level shifter current source comprises an NMOS current source.

36. The imaging system of claim 21, wherein the second input of the comparator is AC coupled to receive the ramp signal through a capacitor.

37. The imaging system of claim 32, wherein the comparator further comprises a switch coupled between the gate of the second input transistor and a node between the second input transistor and the current mirror.

* * * * *

UNITED STATES PATENT AND TRADEMARK OFFICE
CERTIFICATE OF CORRECTION

PATENT NO. : 10,924,701 B2
APPLICATION NO. : 16/516097
DATED : February 16, 2021
INVENTOR(S) : Hiroaki Ebihara et al.

It is certified that error appears in the above-identified patent and that said Letters Patent is hereby corrected as shown below:

In the Claims

| Column | Line | |
|---|---|---|
| 12 (Claim 1, Line 4) | 28 | "representative of an image change" should read "representative of an image charge" |
| 12 (Claim 1, Line 11) | 35 | "coupled to the amplifier switch;" should read "coupled to the amplifier output switch;" |
| 12 (Claim 1, Line 12) | 36 | "a comparator auto-zero coupled" should read "a comparator auto-zero switch coupled" |

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*